Sept. 6, 1938.  J. E. DORAN  2,129,049
MEANS FOR REGULATING THE RATE OF FEED OF A
MILLING MACHINE OR OTHER MACHINE TOOL
Original Filed Feb. 15, 1935  3 Sheets-Sheet 1

INVENTOR.
John E. Doran

Sept. 6, 1938.  J. E. DORAN  2,129,049
MEANS FOR REGULATING THE RATE OF FEED OF A
MILLING MACHINE OR OTHER MACHINE TOOL
Original Filed Feb. 15, 1935  3 Sheets-Sheet 3

INVENTOR.
John E. Doran

Patented Sept. 6, 1938

2,129,049

UNITED STATES PATENT OFFICE 2,129,049

MEANS FOR REGULATING THE RATE OF FEED OF A MILLING MACHINE OR OTHER MACHINE TOOL

John E. Doran, Cincinnati, Ohio, assignor to The G. A. Gray Company, Cincinnati, Ohio, a corporation of Ohio Substitute for abandoned application Serial No. 6,715, February 15, 1935. This application April 18, 1938, Serial No. 202,724

12 Claims. (Cl. 90—21)

This invention relates to a new and useful means and method for regulating the rate of feed of a milling machine or other machine tool whereby the rate of feed is so regulated as to maintain a nearly constant power input to the driving motor, which, in the case of a milling machine maintains a nearly constant torque on the milling cutter, so that the power required for cutting will not be excessive, if this be the limiting factor in the rate of feed, or the load on the cutter teeth will not be excessive, if this be the limiting factor in the rate of feed.

My invention is particularly applicable to those types of machine tools where the feed is driven by a separate variable speed motor. Throughout the remainder of this disclosure, the invention will be described in that form adapted for application to planer-type milling machines.

When milling work with large cutters, either face mills, slab mills or form cutters, the width of the cut sometimes varies and the depth of the cut quite frequently varies. In order to use the milling machine as efficiently as possible, the feed should be fast enough to absorb the rated power of the motor driving the cutter, or else it should be fast enough to give a proper tooth load to each of the teeth of the cutter in case the cutter is incapable of absorbing the full power of the motor which drives it. Since castings and forgings are usually rough, with varying amounts of finish, the power required in milling them will vary from point to point on the work in accordance with the depth of finish to be removed.

Also, the width of surface to be finished may vary, sometimes being equal to the full width of the cutter and sometimes being much less. Accordingly, it is desirable to vary the feed so that the work will be done as expeditiously as possible.

Accordingly, I drive the feed of the milling machine by means of a variable speed motor, operating through reduction gearing of any desired ratio. If necessary, the ratio of reduction may be changed by the use of back gears or equivalent devices. I also provide a wattmeter for indicating the power input of the motor which drives the cutter, commonly called the spindle motor. This wattmeter also operates control apparatus which speeds up the feed motor when the power input of the spindle motor falls off, and slows down the feed motor when the power input of the spindle motor is increased beyond the limits which the operator considers reasonable for the particular piece of work in hand. Thus the maximum safe feed is always operating, and in case the operator is milling pads or other projections the feed proceeds at the maximum rate for which the device is set between cuts, and then slows down to that proper for the particular service when the load on the cutter increases. Incidentally, I provide means whereby the operator may see what power the spindle motor is taking and so may know whether the cutter is working to the best advantage or not. I also provide means whereby the maximum and the minimum power absorbed by the spindle motor may be varied at the will of the operator, so that the operator may increase the power input for large cutters of rugged design, and diminish it for small cutters of delicate design.

I also provide means whereby the operator may predetermine the maximum rate of feed irrespective of the power taken by the motor, so that in case a narrow ledge or a very small pad is encountered by the cutter, the feed will not be so great as to throw extraordinary duty upon two or three of the cutter blades. In case the machine is provided with two or more heads, I provide means by which the feed control mechanism, including the wattmeter, may be connected to any desired head, which will usually be the head requiring the slowest feed.

It is apparent that by means of my device the efficiency of the milling machine can be greatly increased, and at the same time the breakage of cutters reduced.

This application is a substitute for abandoned application Serial No. 6,715, filed February 15, 1935.

In the drawings, Fig. 1 is an isometric projection of a planer-type milling machine fitted with my feed control system.

Figure 1:
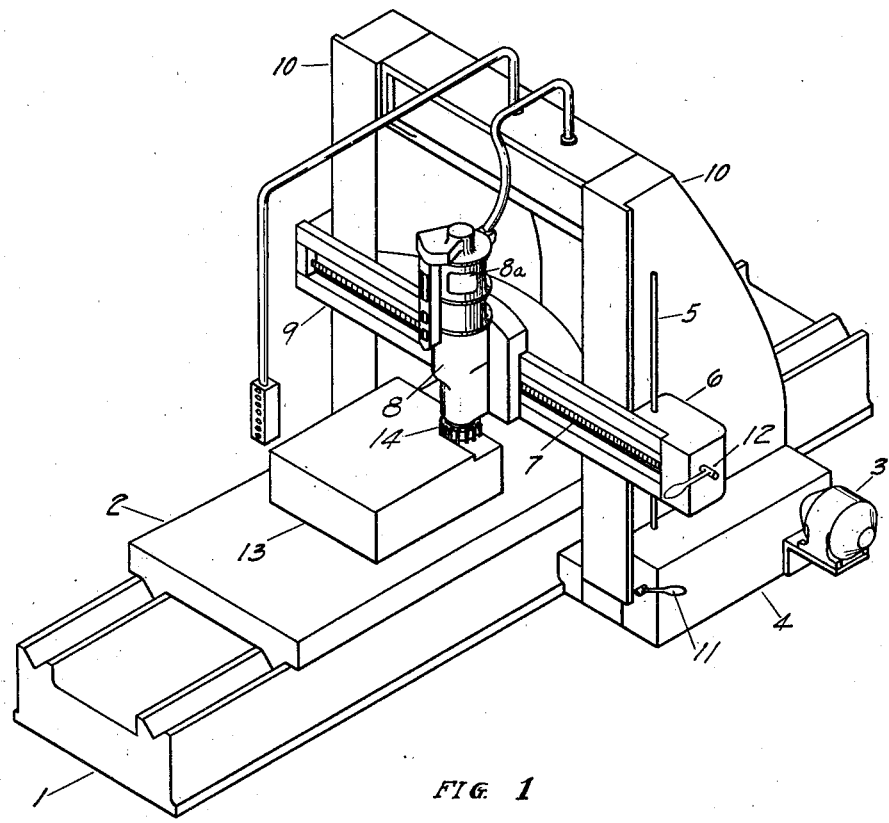

Referring to Fig. 1, 1 is the bed and 2 the table of a planer-type milling machine. 3 is a feed motor which drives gearing contained in box 4 and in the bed, for moving the table. This gearing is not shown, since it is already well known in the art. This gearing also drives by means of a vertical shaft 5, the feed works contained in box 6, which rotates screw 7, which gives cross feed to milling head 8. It is not deemed necessary to illustrate this part of the feed works contained in box 6, since it is already well known in the art.

Milling head 8 is guided and supported by rail 9, which is supported on housings 10 fastened to the bed.

Lever 11 is a clutch operating lever, which connects and disconnects the table feed from the gearing driven by motor 3.

Lever 12 is also a clutch operating lever, which connects and disconnects the feed mechanism in box 6 from the screw 7.

On the table is fastened work piece 13 which is to be machined on its upper surface by cutter 14 which is fast to the spindle of milling head 8, the spindle in milling head 8 being driven by gearing not shown, already well known in the art, which in turn is driven by the motor 8a which is integral with the milling head.

The motor 8a is first started by throwing the switch 15, shown in the wiring diagram, thus supplying power to the motor 8a. Motor 8a is here shown as a direct current motor, but any other type of motor may be used, provided that connections and equipment suitable for the type of current and motor employed, be used instead of the connections to the motor 8a, and between the motor 8a and the wattmeter 18, and the associated equipment shown in Fig. 2. A suitable electromagnetic starter may also be used in place of switch 15, if desirable.

As soon as the switch has been thrown, the cutter will start to revolve, and by pressing push button 16, contactor 24 is caused to close, supplying direct current to feed motor 3, which will almost immediately operate at the maximum speed for which the rheostat is set, for reasons which will appear later.

Accordingly the work is fed rapidly toward the cutter if the table be fed, or the cutter against the work if the milling head be fed, until the cutter begins to cut into the work piece, when the power required by motor 8a increases beyond that required to turn the gearing and supply the losses in the motor.

In the line supplying current to the motor 8a is a shunt 17 which supplies current to wattmeter 18, the current supplied being proportional to the current taken by the motor. Also, between the two power lines A and B, leading to the spindle motor, are connected leads 18c to the wattmeter, which supply a small current proportional to the voltage supplied to the motor.

The elements which move the needle 18a of the ammeter are arranged in the manner usual in the art, so that the indication of the needle is approximately determined by the power input of the motor 8a, the needle moving farther and farther to the right as the power input increases.

The ammeter which I use has elements additional to those usually used in an ammeter, in order that the indication of the ammeter may be used to control the rate of feed.

On the needle of the ammeter, and insulated from the remainder of the mechanism, is a double faced contact 18b. To the right of the needle is an arm 19 which can be turned about a point at or near the pivot of the ammeter needle by means of knob 19a. On the arm is contact 19b which is capable of making contact with contact 18b on the ammeter needle 18a when it has moved sufficiently to the right.

To the left of the ammeter needle is arm 20 which is turned about a point at or near the pivot of the needle by knob 20a, and carries contact 20b which is also capable of making contact with the contact 18b on the needle when the needle moves sufficiently to the left. The angular positions of arms 19 and 20 may be adjusted manually so the ammeter needle 18 will always lie between any desired limits, the difference between its extreme positions being large or small, according to the adjustment.

Contacts 19b and 20b are connected to two contactors 21 and 22, the current from them passing through the coils of 21 and 22.

The needle contact 18b is connected to line A in the manner shown diagrammatically in Fig. 1, through the switch 23, the opening of which makes the device inoperative.

Figure 2:
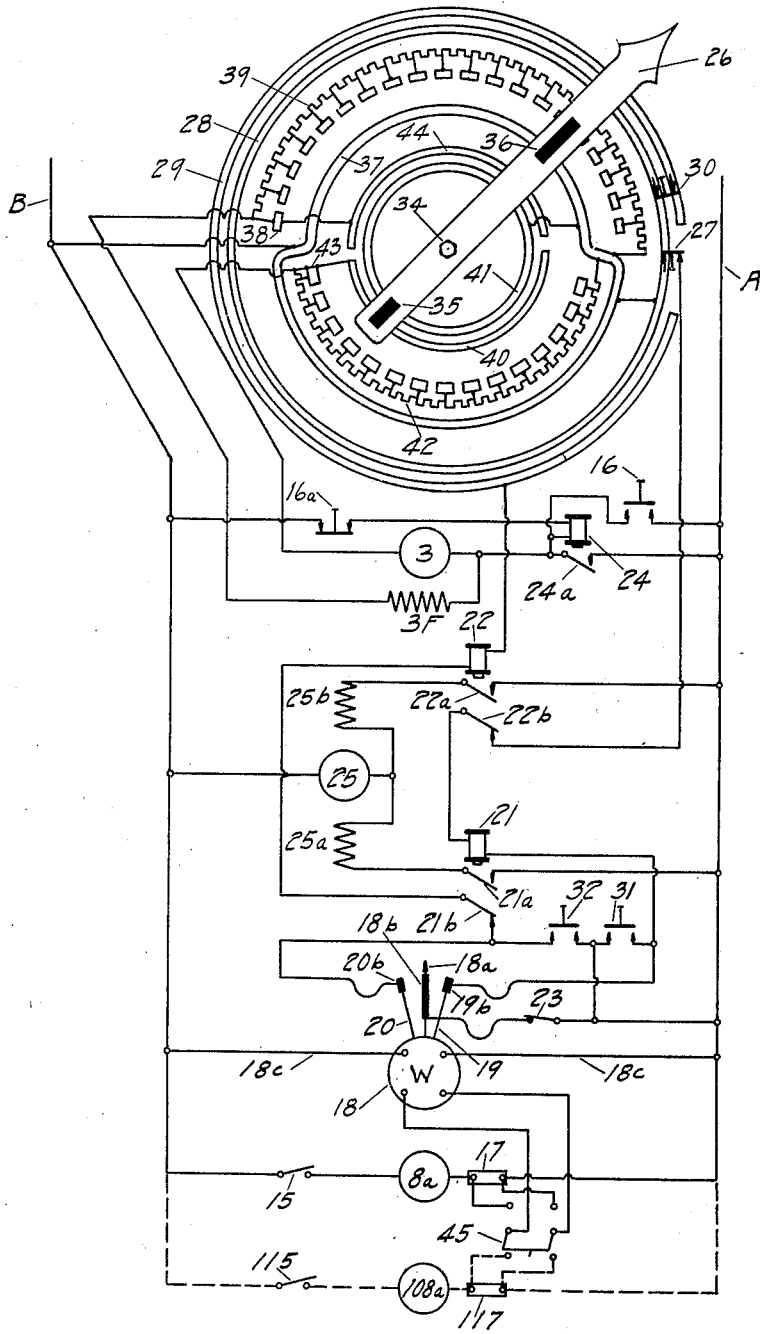
Fig. 2 is a wiring diagram showing the connections which actuate the feed motor in accordance with the power taken by the spindle motor.
Figure 3:
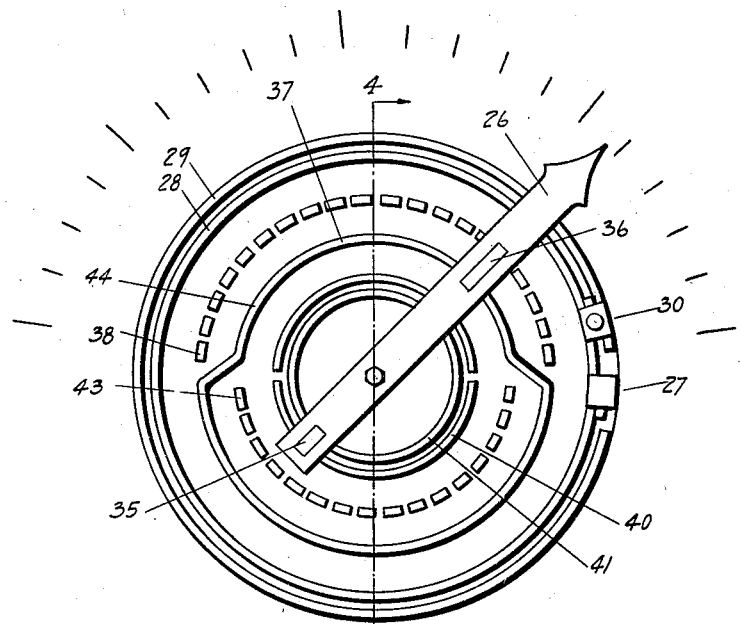
Fig. 3 is a front view of the rheostat which regulates the speed of the feed motor.
Figure 4:
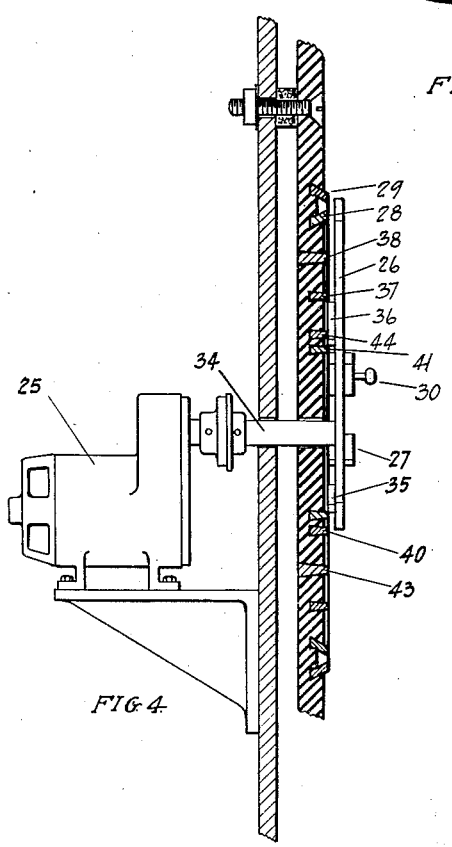
Fig. 4 is a vertical section in line 4—4 of the rheostat, in order to show how the rheostat is actuated by a gear motor.
Figure 5:
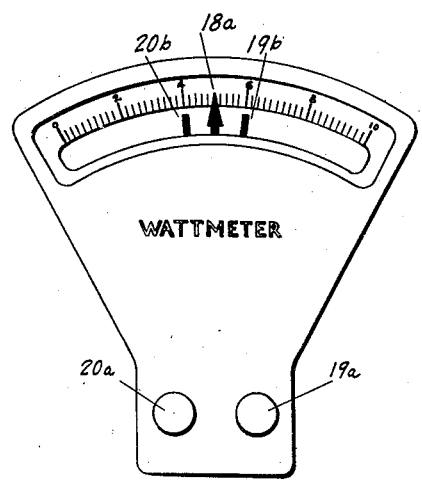
Fig. 5 is a front view of the wattmeter.

The feed motor 3 is supplied with field current and also with armature current through a rheostat shown diagrammatically in Fig. 2, which is operated by a gearmotor 25. Gearmotor 25 is a series motor having a split field, one part of the field tending to cause the armature to revolve in one direction, and the other part of the field to cause the armature to revolve in the other direction. The output shaft of the gearmotor, which rotates at a relatively slow rate of speed, such as one revolution in ten seconds, is attached to the handle 26 of the rheostat for the purpose of turning it. The rheostat connections are arranged in such a way that as 26 rotates through one semi-circumference of the rheostat it increases or diminishes the field current of the feed motor, while the armature voltage remains at its maximum, and as it rotates through the other semi-circumference of the rheostat it diminishes or increases the armature voltage of the feed motor, while the field current remains at its maximum. By this means, any reasonable speed, as for instance from 450 to 1800 R. P. M., may be obtained by field control of the feed motor, and any reasonable speed, as for instance between 200 and 450 R. P. M., by armature control of the feed motor.

Referring to Fig. 2, it will be seen that if the power taken by motor 8a is so great that contact 18b touches contact 19b, contactor 21 will be energized, closing contact 21a and opening contact 21b. Gearmotor 25 will then be energized through field coil 25a which causes its armature to rotate in such a manner as to cause the rheostat handle 26 to move in a counter-clockwise direction. This will cause the field of the feed motor to be strengthened, thus causing the motor to run at a lower speed. When the handle has turned sufficiently so that all of the resistance has been cut out of the field circuit of the feed motor, the rheostat will begin to introduce resistance into the armature circuit of the feed motor, thus slowing it down still further. When the handle of the rheostat has been turned sufficiently by the gearmotor so that all of the available resistance is inserted in the armature circuit of the feed motor, the handle will strike a limit switch 27, arranged in a fixed location, which will open the circuit of contactor 21, thus opening contact 21, and causing the gearmotor to stop, the feed motor now having reached the lowest speed at which it can run.

The manner in which the gearmotor circuit is opened by switch 27 is as follows:—

Conducting ring 37 of the rheostat is connected to line B and to conducting ring 28, to which one contact of limit switch 27 is connected. Conducting ring 37 is of the irregular shape shown. The other contact is connected through contact 22b to coil 21, thence to 19b, 18b, and switch 23 to line A. If switch 27 opens, this circuit is broken, contactor 21 is deenergized, and contact 21a opens and 21b closes. Since 21a energizes gearmotor 25 to turn handle 26 counter-clockwise, gearmotor 25 will stop.

If the power of the spindle motor drops off sufficiently so that contact 18b touches contact 20b, contactor 22 will be energized, closing contact 22a and opening contact 22b, and admitting current to gearmotor field 25b, causing the gearmotor to rotate in such a direction as to move handle 26 of the rheostat in a clock-wise direction, thus increasing the speed of feed motor 3. This will continue until the power absorbed by the spindle motor is great enough to cause wattmeter needle 18a to carry contact 18b away from 20b, breaking the circuit through contactor 22, thus deenergizing the gearmotor, leaving the rheostat arm in whatever position it had at the time that 18b and 20b separated. It will then remain in that position while the needle may move forward and backward between 19b and 20b, as the power required by the spindle motor increases or diminishes. As soon as the power has increased so that 18b touches 19b, gearmotor 25 will be energized through field 25a by the energizing of contactor 21, and the rheostat handle will move counter-clockwise, slowing down the motor 3. If, however, the power required by the motor falls off until 18b again touches 20b, contactor 22 will be energized, energizing the gearmotor through field 25b and causing the rheostat handle to move in clockwise direction, which will diminish the resistance in the armature circuit of the feed motor 3, or increase the resistance in its field circuit, thus increasing the speed of the feed motor.

On a pair of conducting rings 28 and 29 is mounted an adjustable limit switch 30 which will be touched by the handle 26 of the rheostat whenever the latter has moved sufficiently in a clockwise direction. This limit switch 30 is adjusted by the operator for whatever maximum feed may be suitable for the work in hand. The position of switch 30 determines the maximum rate of feed at which the machine will operate. This limit switch 30 is opened whenever the rheostat handle presses the button, and so opens the circuit through contactor 22.

The method by which limit switch 30 functions is as follows:

A circuit from line B through conducting ring 37 and thence to conducting ring 28, runs to one terminal of the limit switch. The other terminal of the limit switch connects with conducting ring 29, thence to coil 22 of contactor 22, thence through contact 21b to contacts 20b and 18b and switch 23 to line A. When limit switch 30 opens contactor 22 is deenergized, opening contact 22a which deenergizes motor 25 and its coil 25b.

If desired, the machine may be operated at any suitable constant feed, using the wattmeter needle 18a only to indicate the power.

When it is desired to operate the machine with a constant feed without having the wattmeter indication affect the amount of feed, switch 23 is opened, disconnecting contact 18b from line A, whereupon motor 25 will no longer be controlled by the operation of the wattmeter. In order that the needle 18a may indicate the power input of the wattmeter over the entire range of its movement, contact 19b is moved to the right and contact 20b moved to the left, by turning knobs 19a and 20a, which gives the needle 18a unobstructed movement over its entire range.

If, now, it is desired to change the speed of the feed motor 3, the buttons 31 and 32 are used for this purpose. If it is desired to reduce the feed, button 31 is pressed, creating a connection from line A, through 31, through contactor 21, through normally closed contact 22b, through push button 27, to conducting ring 28, thence to ring 37 which is connected to line B. Since contactor 21 is now energized, contact 21b will open, and contact 21a will close, which energizes motor 25 through field 25a, causing the handle of the rheostat to revolve counter-clockwise, reducing the speed of feed motor 3.

If, however, it is desired to increase the feed, button 32 is pressed, allowing current from line A to flow through button 32, normally closed contact 21b, contactor 22, ring 29, limit switch 30, ring 38, and ring 37, to line B. Energizing contactor 22 opens contact 22b and closes contact 22a, energizing motor 25 through field coil 25b. This causes handle 26 to revolve clockwise, increasing the speed of motor 3, and thus increasing the feed.

If, while using button 31 or 32, handle 26 revolves far enough in one direction or the other to open limit switch 27 or limit switch 30, it is apparent that the circuit through the button being pressed will be opened by limit switch 27 when button 31 is pressed, and by limit switch 30 when button 32 is pressed, so that contactor 21 or 22 will be deenergized and gearmotor 25 will cease to revolve, when the handle has revolved to the position of minimum speed, and touches limit switch 27, or of maximum speed, and touches limit switch 30.

The contacts 21b and 22b are interlocks which insure that contactors 21 and 22 cannot both be energized at the same time, for if 21b is open 22 cannot be energized, and if 22b is open 21 cannot be energized. It is obvious that if both contactors were energized at the same time, thus closing contacts 21a and 22a simultaneously, gearmotor 25 would be energized through both fields 25a and 25b at the same time. Since 25a and 25b oppose one another, there would be no field flux to produce rotation, and gearmotor 25 would then be short-circuited between line A and line B.

It will be seen that feed motor 3 is energized when contact 24a is closed, which establishes a circuit from line A through the armature of motor 3, through conducting ring segment 40, through brush 35, to conducting ring 41, and thence to conducting ring 37 which is connected to line B. At the same time, it also establishes a circuit through the field 3f of feed motor 3 from line A, through contact 24a, to the first of the field rheostat contacts 38, thence through the successive field resistances 39, through brush 36, to conducting ring 37 which is connected to line B.

In order to close contact 24a and energize feed motor 3, it is only necessary to press push button 16, which energizes contactor 24. Contactor 24 is not only energized from push button 16, but from the circuit between contact 24a and feed motor 3, thence through normally closed push button 16a to line B. Consequently, as soon as 24a closes, push button 16 may again open, but contactor 24 will remain energized and contact 24a remain closed. When it is desired to stop feed motor 3, button 16a is pressed, which deenergizes contactor 24, allowing contact 24a to open, which deenergizes feed motor 3.

It is next in order to explain the operation of the rheostat which controls the speed of rotation of the feed motor. At the center of the rheostat is a shaft 34 which is turned by gearmotor 25. On this shaft is mounted handle 26 of insulating material which carries two spring pressed brushes 35 and 36. In the position shown, the brush 36 presses against a conducting ring 37 of irregular shape, and also against any one or two of a series of contacts 38, the width of the brush being made greater than the distances between the contacts, but less than the width of the contacts, in order to avoid arcing as the handle 26 turns, and the brush passes from contact to contact. Each of these contacts 38 is mounted in the face of the rheostat, which is made of insulating material, and is connected to a series of resistances 39 which are inserted in the field circuit of the feed motor 3.

With the handle 26 in the position shown, all those resistances 39 shown at the left of the handle around to the first rheostat field control contact 38, are inserted in the field circuit, which runs from line A through contact 24a, through the field coils 3f to contact 38, thence through the several field resistances 39, thence through brush 36 to conducting ring 37 which is connected to line B. The armature of feed motor 3 receives current through the circuit which runs from line A through contact 24a, through the armature coils, through first rheostat armature control contact 43, through conducting ring segment 40, thence through brush 35, to conducting ring 41 which is connected to conducting ring 37 which is connected to line B. Thus there is resistance in the field circuit and no appreciable resistance in the armature circuit except that provided by the armature conductors and the circuits mentioned, which have relatively small resistance.

If, however, handle 26 be revolved counterclockwise through 180 degrees, the circuits will then be as follows: The field will be connected with a line A through contact 24a, and with contact 38 which is connected with conducting ring segment 44, which will then be connected by brush 35 with conducting ring 41 which is connected to conducting ring 37 which is connected with line B. The only appreciable resistance in the field circuit is then the resistance of the field itself, the resistance of the other parts being relatively small. The armature now receives its current through a circuit from line A through contact 24a, the armature coils of feed motor 3, the armature resistances 42 which lie between contact 43 and the new position of brush 36, through which the current passes from one of the armature rheostat contacts 43 to conducting ring 37 which is connected with line B.

Thus it will be seen that the armature circuit now has resistance in it, while the field coil circuit has no appreciable resistance except that of the field coils. In consequence of this, the voltage across the brushes of the armature will be reduced by the passage of current through the armature circuit resistances in the rheostat, while the field flux will still continue to be maximum, and the motor because of the reduced armature voltage, will run at lower speed than it would if it ran with full armature voltage and full field current.

An inspection of Figure 2 in the light of this disclosure will show that the invention consists in the application to a machine tool, or some other mechanism, driven by a source of mechanical power and having a direct current adjustable speed motor for moving the parts of the mechanism relative to one another for feeding, of control means for adjusting the rate of feed in accordance with the power input of the source of power. The control means disclosed consists of a power measuring device, a rheostat, a split field motor to turn the rheostat, and relays and contactors actuated by the power measuring device, for causing the split field motor to move the rheostat in such a manner as to increase or decrease the field current of the feed motor, or to decrease or increase the impressed voltage at the armature brushes of the feed motor.

In case two spindle motors are used, the circuit may be arranged as shown in Fig. 2 in which 108a is the second spindle motor, and 115 is the switch which energizes it. Spindle motors 8a and 108a are both supplied with current from lines A and B, the current passing through shunt 17 for spindle motor 8a and shunt 117 for spindle motor 108a. A double pole, double throw switch 45 is arranged so that the current connections of wattmeter 18 may be connected with the terminals of shunt 17, or of shunt 117, according to the desire of the operator. If connected to shunt 17, motor 8a will control the rate of feed. If connected to shunt 117, motor 108a will control the rate of feed.

It will be apparent to all those familiar with the art that if a spindle motor such as 8a be connected to a wattmeter such as wattmeter 18, provided with the contacts shown, and these contacts be connected by proper electromagnetically operated controls to any type of power feed apparatus, such for instance as a hydraulic feed apparatus, the indications of the wattmeter 18 may be used to control the rate of the feed, whatever the nature of its driving mechanism.

It may be pointed out that the same type of feed control is applicable not only to a milling machine, but also to any type of machine tool where the cut is continuous, so that the wattmeter needle does not drop back toward zero at the end of a cut, as it would do in the case of a planer, or in the case of a boring mill or lathe taking an intermittent cut. It is necessary, however, that the machine tool be provided with independent power means for operating the feed mechanism. It makes no difference whether the motor, which is in this disclosure designated as a spindle motor, causes the cutter to move or causes the work to move, provided only that the power of the motor be absorbed principally by the work of cutting. Also, it is immaterial whether the cutter be fed or whether the work be fed. In any case, an apparatus based on the principles herein disclosed, will cause the feed to adjust itself at that point where the power taken by the motor does not exceed a desired maximum, or fall below a desired minimum.

The limit switch 30 is arranged to slide in a dovetail between conducting circles 28 and 29, which are insulated from one another, being connected by the movable contact of the switch, whose fixed contacts are connected, one with each circle.

It may be pointed out that arms 19 and 20 are manually adjustable so that the space between them may embrace any portion, large or small, of the travel of the needle, so that the power input of the spindle motor may be confined between any desired limits within the range of the wattmeter.

While a visual type wattmeter having a moving needle which indicates the rate of power input of the spindle motor is preferable to any other type, because it not only controls the feed, but also indicates to the operator the power input, it is possible to control the feed with any type of device having a moving element, the position of which is determined by the power input of the spindle motor. Such a device is not only capable of controlling the feed by electrical means, but may also be used to operate other means for controlling the feed. It may be noted that the wattmeter is not a watt-hour meter, sometimes known as an integrating wattmeter, since the energy consumption of the spindle motor is not important, but only the rate of energy consumption.

Also, various changes may be made in the circuits shown without affecting in any degree the principle of my invention.

Finally, I may point out that a machine tool may be driven by any type of power, and if the power input be caused to determine the position of any sort of a moving element, and the feed be driven by any sort of adjustable speed device, and means be provided to control the speed adjustment by the position of the moving element, the same result will be accomplished by the same principle of operation. I therefore do not wish to limit my invention to the exact form illustrated, but to include all forms of feed control which fall within the scope of the appended claims.

I claim:

1. In a milling machine, a spindle motor for driving the cutter, feed mechanism for moving the work and the cutter relatively to one another for feeding, an adjustable speed feed motor for driving the feed mechanism, a rheostat for controlling the speed of the feed motor, a reversible motor for operating the rheostat, a wattmeter to indicate the power input of the spindle motor, a first contact on the moving element of the wattmeter, a second contact adapted to be touched by the first contact when the moving element is moved sufficiently by an increase in the power input of the spindle motor, a third contact adapted to be touched by the first contact when the moving element is moved sufficiently by a reduction in the power input of the spindle motor, control means adapted to be energized by the first contact when touching the second contact, for energizing the reversible motor in one direction, and control means adapted to be energized by the first contact when touching the third contact, for energizing the reversible motor in the other direction.

2. In a machine tool, an electric motor for supplying power to perform the cutting, a wattmeter having a moving element positioned by the power input of the electric motor, a first contact on the moving element of the wattmeter, a second contact adapted to be touched by the first contact when the moving element is moved sufficiently by an increase in the power input of the electric motor, a third contact adapted to be touched by the first contact when the movable element is moved sufficiently by a reduction in the power input of the motor, feed mechanism, adjustable speed power means adapted to drive the feed mechanism, a first control means for adjusting the speed of the power means for driving the feed mechanism, a second control means adapted to be energized when the first contact touches the second contact, for operating the first control means, in such a manner as to cause it to decrease the speed of the adjustable power means and a third control means adapted to be energized when the first contact touches the third contact, for actuating the first control means, in such a manner as to cause it to increase the speed of the adjustable speed power means.

3. In a machine tool, an electric motor for supplying power to perform the cutting, a wattmeter having a moving element positioned by the power input of the electric motor, a first contact on the moving element of the wattmeter, a second contact adapted to be touched by the first contact when the moving element is moved sufficiently by an increase in the power input of the motor, a third contact adapted to be touched by the first contact when the moving element is moved sufficiently by a reduction in the power input of the motor, connections from the second and third contacts to control circuits, adjustable speed power means adapted for feeding, a first control means in the circuit from the second contact adapted when energized to reduce the speed of the adjustable speed power means, and a second control means in the circuit from the third contact, adapted when energized to increase the speed of the adjustable speed power means.

4. In a machine tool, a first electric motor adapted to provide power for cutting, a wattmeter having a moving element positioned by the power input of the first electric motor, a first contact on the moving element of the wattmeter, a second contact adapted to be touched by the first contact when the moving element is moved sufficiently by an increase of the power input of the first motor, a third contact adapted to be touched by the first contact when the moving element is moved sufficiently by a reduction in the power input of the first motor, feed mechanism, a second electric motor adapted to drive the feed mechanism, a rheostat adapted to control the speed of the second electric motor, a third reversible electric motor adapted to move the contact brushes of the rheostat, a first control element adapted when energized to energize the third motor for adjusting the rheostat to reduce the speed of the second motor, a second control element adapted when energized to energize the third motor for adjusting the rheostat to increase the speed of the second motor, a circuit from the second contact adapted to energize the first control means, and a circuit from the third contact adapted to energize the second control means.

5. In a feed control mechanism, a contact making wattmeter having a moving element adapted to be positioned by the power input of an electric motor, a first contact carried by the moving element, a second contact adapted to be touched by the first contact and to be manually adjusted in positon, a third contact adapted to be touched by the first contact and to be manually adjusted in position, a first control element adapted to be energized when the first contact touches the second contact, a second control element adapted to be energized when the first contact touches the third contact, and reversible power means adapted to be energized for movement in one direction by the first control means and energized for movement in the other direction by the second control means.

6. In a feed control mechanism, an adjustable speed feed motor adapted to drive feed mechanism, a rheostat for adjusting the speed of the feed motor, a reversible power means for adjusting the rheostat, a first control means adapted to energize the reversible power means for increasing the speed of the feed motor, a second control means adapted to energize the reversible power means for decreasing the speed of the feed motor, and a limit switch adapted to be actuated by the rheostat when adjusted for minimum feed motor speed, for deenergizing the second control means.

7. In a feed control mechanism, an adjustable speed feed motor adapted to drive feed mechanism, a rheostat for adjusting the speed of the feed motor, a reversible power means for adjusting the rheostat, a first control means adapted to energize the reversible power means for increasing the speed of the feed motor, a second control means adapted to energize the reversible power means for decreasing the speed of the feed motor, and a limit switch adjustable in position and adapted to be actuated by the rheostat for deenergizing the first control means.

8. In a feed control mechanism, an adjustable speed feed motor adapted to drive feed mechanism, a rheostat for adjusting the speed of the feed motor, a reversible power means for adjusting the rheostat, a first control means adapted to energize the reversible power means for increasing the speed of the feed motor, a second control means adapted to energize the reversible power means for decreasing the speed of the feed motor, a first limit switch adapted to be actuated by the rheostat for deenergizing the second control means, and a second adjustable position limit switch adapted to be actuated by the rheostat for deenergizing the first control means.

9. In combination, in a machine tool, means adapted to support a work piece, a cutting tool, power means adapted to move the work piece and the cutting tool relatively to one another for cutting, a direct current adjustable speed motor adapted to move the work piece and the cutting tool relatively to one another for feeding, and control means adapted to control the field current of the adjustable speed motor, and to be actuated by the power input of the power means.

10. In combination, in a machine tool, means adapted to support a work piece, a cutting tool, power means adapted to move the work piece and the cutting tool relatively to one another for cutting, a direct current adjustable speed motor adapted to move the work piece and the cutting tool relatively to one another for feeding, and control means adapted to control the impressed armature voltage of the adjustable speed motor and to be actuated by the power input of the power means.

11. In combination, in a machine tool, means adapted to support a work piece, a cutting tool, a first electric motor adapted to move the work piece and cutting tool relatively to one another for cutting, a second direct current adjustable speed electric motor adapted to move the work piece and the cutting tool relatively to one another for feeding, and means actuated by the power input of the first motor adapted to control the field current of the second motor.

12. In combination in a machine tool, means adapted to support a work piece, a cutting tool, a first electric motor adapted to move the work piece and cutting tool relatively to one another for cutting, a second direct current adjustable speed electric motor adapted to move the work piece and the cutting tool relatively to one another for feeding, and means actuated by the power input of the first motor and adapted to control the impressed armature voltage of the second motor.

JOHN E. DORAN.